(12) United States Patent
Filippo et al.

(10) Patent No.: US 11,314,648 B2
(45) Date of Patent: Apr. 26, 2022

(54) DATA PROCESSING

(71) Applicant: ARM Limited, Cambridge (GB)

(72) Inventors: Michael Filippo, Austin, TX (US);
Jamshed Jalal, Austin, TX (US); Kias Magnus Bruce, Leander, TX (US);
Alex James Waugh, Cambridge (GB);
Geoffray Lacourba, Nice (FR); Paul Gilbert Meyer, Austin, TX (US);
Bruce James Mathewson, Papworth Everard (GB); Phanindra Kumar Mannava, Austin, TX (US)

(73) Assignee: Arm Limited, Cambridge (GB)

( * ) Notice: Subject to any disclaimer, the term of this patent is extended or adjusted under 35 U.S.C. 154(b) by 231 days.

(21) Appl. No.: 15/427,421

(22) Filed: Feb. 8, 2017

(65) Prior Publication Data

US 2018/0225216 A1 Aug. 9, 2018

(51) Int. Cl.
*G06F 12/0862* (2016.01)
*G06F 12/0831* (2016.01)
(Continued)

(52) U.S. Cl.
CPC ........ *G06F 12/0862* (2013.01); *G06F 11/349* (2013.01); *G06F 11/3419* (2013.01);
(Continued)

(58) Field of Classification Search
CPC ............. G06F 12/0862; G06F 15/7825; G06F 2212/602; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40;
(Continued)

(56) References Cited

U.S. PATENT DOCUMENTS 6,343,352 B1 * 1/2002 Davis ................. G11C 11/4076
711/158
2007/0226449 A1 9/2007 Akimoto
(Continued)

FOREIGN PATENT DOCUMENTS

CN 105765575 7/2016

OTHER PUBLICATIONS

"IEEE Standard for a High-Performance Serial Bus," in IEEE Std 1394-2008 , vol., No., pp. 1-954, Oct. 21, 2008, doi: 10.1109/IEEESTD.2008.4659233. (Year: 2008).*
(Continued)

*Primary Examiner* — Daniel C. Chappell
(74) *Attorney, Agent, or Firm* — Nixon & Vanderhye P.C.

(57) ABSTRACT

Data processing apparatus comprises a data access requesting node; data access circuitry to receive a data access request from the data access requesting node and to route the data access request for fulfilment by one or more data storage nodes selected from a group of two or more data storage nodes; and indication circuitry to provide a source indication to the data access requesting node, to indicate an attribute of the one or more data storage nodes which fulfilled the data access request; the data access requesting node being configured to vary its operation in response to the source indication.

17 Claims, 13 Drawing Sheets

(51) Int. Cl.
*G06F 12/0811* (2016.01)
*G06F 15/78* (2006.01)
*G06F 11/34* (2006.01)

(52) U.S. Cl.
CPC ...... *G06F 12/0811* (2013.01); *G06F 12/0833* (2013.01); *G06F 15/7825* (2013.01); *G06F 2212/502* (2013.01); *G06F 2212/507* (2013.01)

(58) Field of Classification Search
CPC ....... G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G05B 13/00–048; G05B 15/00–02; G05B 17/00–02; G06K 9/00–82; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3297; H01L 2225/00–1094; H04L 9/00–38; H04L 12/00–66; H04L 41/00–5096; H04L 49/00–9094; H04L 61/00–6095; H04L 67/00–42
See application file for complete search history.

(56) References Cited

U.S. PATENT DOCUMENTS

| | | | |
|---|---|---|---|
| 2011/0213925 A1* | 9/2011 | Ledford | G06F 11/3037 711/113 |
| 2012/0102273 A1* | 4/2012 | Chang | G06F 12/0692 711/143 |
| 2014/0195745 A1* | 7/2014 | Shiratori | G06F 12/00 711/154 |
| 2015/0347015 A1 | 12/2015 | Pawlowski | |
| 2016/0034399 A1* | 2/2016 | Giri | G06F 12/0848 711/125 |
| 2016/0364145 A1* | 12/2016 | Smith | G06F 9/50 |

OTHER PUBLICATIONS

Combined Search and Examination Report dated Aug. 24, 2018 in GB Application No. 1801093.4, 6 pages.
Examination Report for GB Application No. 1801093.4 dated Feb. 26, 2019, 3 pages.
Office Action for TW Application No. 107104283 dated Sep. 15, 2021 and English translation, 20 pages.
Office Action for TW Application No. 107104283 dated Jan. 27, 2022 and English translation, 33 pages.

\* cited by examiner

DATA PROCESSING

BACKGROUND

This disclosure relates to data processing.

Data transfer protocols can regulate the operation of data transfers between devices or nodes connected to one another via interconnect circuitry, for example in the context of a system on chip (SoC) or network on chip (NoC) system. An example of such a data transfer protocol is the so-called AMBA (Advanced Microcontroller Bus Architecture) CHI (Coherent Hub Interface) protocol.

In the CHI protocol, nodes can be categorised as request nodes (RN), home nodes (HN) or slave nodes (SN). Nodes can be fully coherent or input/output (I/O) coherent. A fully coherent HN or RN (HN-F, RN-F respectively) includes coherent cache storage; a fully coherent SN (SN-F) is paired with an HN-F. An HN-F can manage coherency and/or serialisation for a memory region, and may be referred to as an example of a point of coherency (POC) and/or point of serialisation (POS).

Here, the term "coherent" implies that that data written to a memory address in the coherent memory system by one node is consistent with data read from that memory address in the coherent memory system by another of the nodes. A role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then coherence logic avoids conflicts with other existing copies of the data item.

Serialisation relates to the ordering of the handling of memory access requests from potentially multiple requesting nodes, and potentially taking different latency periods to be serviced, so that the results from those requests are presented in the correct order to the requesting nodes, and any dependencies between the requests (for example, a data read subsequent to a data write to the same address) are correctly handled.

Data accesses such as read requests may be made via the HN-F, which may either service the read request itself (for example, by accessing a cache memory) or may refer the read request to an SN-F for resolution, for example, if the required data item has to be read from main memory or a higher level cache memory. In such examples, the SN-F may comprise a dynamic memory controller (DMC) associated with a memory such as a dynamic random access memory (DRAM). The HN-F handles the issuing of a read request to the SN-F in instances in which the HN-F cannot itself service the request.

Other example protocols include the AXI (Advanced Extensible Interface) or ACE (AXI Coherency Extensions) protocols The ACE protocol does not make use of a HN for example, but can provide a POC/POS, for example implemented by an interconnect.

SUMMARY

In an example arrangement there is provided data processing apparatus comprising:
 a data access requesting node;
 data access circuitry to receive a data access request from the data access requesting node and to route the data access request for fulfilment by one or more data storage nodes selected from a group of two or more data storage nodes; and
 indication circuitry to provide a source indication to the data access requesting node, to indicate an attribute of the one or more data storage nodes which fulfilled the data access request;
 the data access requesting node being configured to vary its operation in response to the source indication.

In another example arrangement there is provided data storage apparatus comprising:
 data access circuitry to receive a data access request from a data access requesting node in data communication with the data access circuitry and to route the data access request for fulfilment by one or more data storage nodes selected from a group of two or more data storage nodes;
 acknowledgement circuitry to provide an acknowledgement message to the data access requesting node to indicate fulfilment of the data access request;
 indication circuitry to associate with the acknowledgement message a source indication, indicating an attribute of one or more of the group of data storage nodes which fulfilled the data access request.

In another example arrangement there is provided a data processing method comprising:
 receiving a data access request from a data access requesting node;
 routing the data access request for fulfilment by one or more data storage nodes selected from a group of two or more data storage nodes;
 providing a source indication to the data access requesting node, to indicate an attribute of the one or more data storage nodes which fulfilled the data access request;
 varying the operation of the data access requesting node in response to the source indication.

In another example arrangement there is provided a data storage method comprising:
 receiving a data access request from a data access requesting node;
 routing the data access request for fulfilment by one or more data storage nodes selected from a group of two or more data storage nodes;
 providing an acknowledgement message to the data access requesting node to indicate fulfilment of the data access request; and
 associating with the acknowledgement message a source indication, indicating an attribute of one or more of the group of data storage nodes which fulfilled the data access request.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
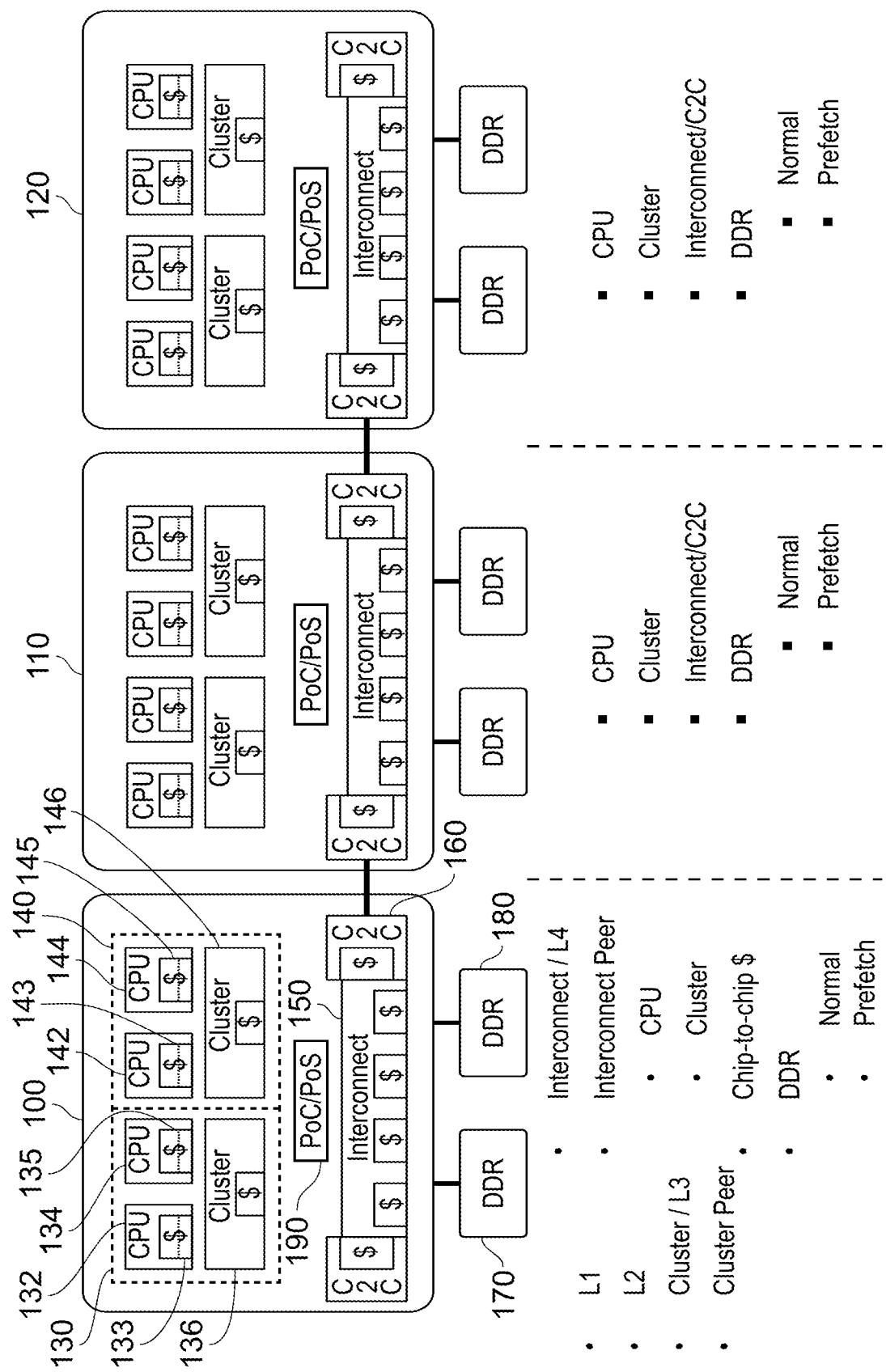
FIG. 1 schematically illustrates a data processing apparatus.

Before discussing the embodiments with reference to the accompanying figures, the following description of embodiments is provided.

An example embodiment provides data processing apparatus comprising:

a data access requesting node;

data access circuitry to receive a data access request from the data access requesting node and to route the data access request for fulfilment by one or more data storage nodes selected from a group of two or more data storage nodes; and indication circuitry to provide a source indication to the data access requesting node, to indicate an attribute of the one or more data storage nodes which fulfilled the data access request;

the data access requesting node being configured to vary its operation in response to the source indication.

Example embodiments of the disclosure provide a return indication to a requesting node, indicating an attribute of a node which fulfilled a data access request. This may be an attribute of a target (slave) node or of another node involved in fulfilling the request such as a routing node. The attribute can for example identify or classify the one or more nodes, and/or indicate a manner by which they handled the request, and/or provide other information. Using this information, the requesting node can vary its operation.

In some examples, the attribute comprises information identifying which of the data storage nodes fulfilled the data access request. As mentioned above, this could be classification information identifying a classification of the one or more data storage nodes which fulfilled the data access request. Using the classification information the requesting node can detect, for example, a path to the memory which services a request, and/or whether a request is serviced from cache or external memory, and vary its operation accordingly. For example, the classification may indicate an attribute of a data transfer path between the data access requesting node and the one or more data storage nodes which fulfilled the data access request, such as "on chip/off chip". In examples, the attribute of the data transfer path is indicative of a latency of the data transfer path. In other examples, the data storage nodes are arranged as a hierarchy of storage levels, and the classification indicates the level of the one or more data storage nodes which fulfilled the request. An example of such a classification is that for at least one of the levels, data storage nodes at that level comprise cache memories, and for at least another of the levels, data storage nodes at that level comprise main memories.

An example of a way in which the operation can be varied is that the data access requesting node is configured to vary the issuing of data access requests by that data access requesting node in response to the source indication. For example, the attribute can comprise a loading indication, indicating a level of loading of the one or more data storage nodes which fulfilled the data access request. As an example of varying operation, the data access requesting node may be configured to access two or more data types; and the data access requesting node may be configured to vary a priority of accessing data of the two or more data types in response to the loading indication (for example so as to prioritize certain types of data access if it is apparent from the loading indication that the node(s) servicing the data access requests are heavily loaded).

As an example of varying operation, the data access requesting node may comprise prefetch circuitry; and the data access requesting node may comprise control circuitry to vary the operation of the prefetch circuitry in response to the loading indication. For example, the data access requesting node may be configured, in response to the loading indication, to vary one or more of: a request rate of the prefetch circuitry; an operational status of the prefetch circuitry; a status indication of prefetch data access requests; an accuracy requirement of the prefetch circuitry; a priority of latency-critical data access requests with respect to non-latency-critical data access requests; and a priority of prefetch operations with respect to demand-based data access operations.

In other examples, the data access requesting node comprises: predictor circuitry to predict whether a next data access request will be fulfilled by a first data storage node or a second data storage node, the first and second data storage nodes being arranged so that if a data access request is not fulfilled by the first data storage node, it is fulfilled by the second data storage node; and issue circuitry to issue data access requests for fulfilment by the first data storage node, the issue circuitry being configured to issue an indication, for routing to the second data storage node, that a given data access request may need to be fulfilled by the second data storage node, in response to the predictor circuitry predicting that the given data access request will be fulfilled by the second data storage node. In such arrangements, the attribute may indicate whether the data access request was fulfilled by the first data storage node or the second data storage node; and the predictor circuitry may be configured to vary its prediction operation in response to the source indication. For example, rather than risking bandwidth or other overloading by issuing an excess of such hint indications, they can be predicted in dependence upon whether they provide useful or appropriate in respect of previous data access requests. In some examples, the attribute comprises a success indication, indicating whether the data access request was fulfilled by the data storage node initiating that data access in response to a data access hint message and fulfilling that data access in response to a subsequent data access request.

The source indication can be provided as a "push" or a "pull" message or other provision, or both. In some examples, to avoid routing a separate message, the source indication can be associated with an acknowledgement message. In such examples the apparatus acknowledgement circuitry to provide an acknowledgement message to the data access requesting node to indicate fulfilment of the data access request; in which the indication circuitry is configured to associate the source indication with the acknowledgement message. For example, the indication circuitry may be configured to propagate the source indication with the acknowledgement message Another example embodiment provides data storage apparatus comprising: data access circuitry to receive a data access request from a data access requesting node in data communication with the data access circuitry and to route the data access request for fulfilment by one or more data storage nodes selected from a group of two or more data storage nodes; acknowledgement circuitry to provide an acknowledgement message to the data access requesting node to indicate fulfilment of the data access request; and indication circuitry to associate with the acknowledgement message a source indication, indicating an attribute of one or more of the group of data storage nodes which fulfilled the data access request.

In some examples, the attribute comprises information identifying which of the data storage nodes fulfilled the data access request. In examples, as discussed above, the attribute comprises classification information identifying a classification of the one or more data storage nodes which fulfilled the data access request. In some examples, the attribute comprises a loading indication, indicating a level of loading of the one or more data storage nodes indicated by the source indication.

In some examples, at least one of the data storage nodes comprises memory access circuitry configured: to initiate a data access of data stored in a memory in response to a data access hint message received from another node in data communication with the memory access circuitry and to fulfil a data access of data stored in the memory in response to a subsequent data access request received from another node in data communication with the memory access circuitry. In such instances, the attribute may comprise a success indication, indicating whether the data access request was fulfilled by the data storage node initiating that data access in response to a data access hint message and fulfilling that data access in response to a subsequent data access request.

Another example embodiment provides a data processing method comprising:

receiving a data access request from a data access requesting node;

routing the data access request for fulfilment by one or more data storage nodes selected from a group of two or more data storage nodes;

providing a source indication to the data access requesting node, to indicate an attribute of the one or more data storage nodes which fulfilled the data access request;

varying the operation of the data access requesting node in response to the source indication.

Another example embodiment provides a data storage method comprising:

receiving a data access request from a data access requesting node;

routing the data access request for fulfilment by one or more data storage nodes selected from a group of two or more data storage nodes;

providing an acknowledgement message to the data access requesting node to indicate fulfilment of the data access request; and associating with the acknowledgement message a source indication, indicating an attribute of one or more of the group of data storage nodes which fulfilled the data access request.

FIG. 1 schematically illustrates a data processing apparatus.

In general terms, an arrangement will be described in which a potentially self-tuning, reactive system requires feedback to drive the tuning mechanisms available in the system, for example by source information which may be implemented as a DataSource field. This field may include various types of information.

The DataSource field may include information about which agent in a system ultimately satisfied a memory access request. Example satisfying agents are non-memory (non-DRAM), intra-cluster peer cache, interconnect or cluster cache, inter-cluster peer cache, remote chip cache and memory such as main memory.

This information can be included in or with the response or acknowledgement to any memory access, and can be made visible to a user by the requesting CPU/device tracking these various types of events in a performance-monitor counter (PMC) and using system-level tools and utilities to analyse the occurrence or frequency of these events. If a program or device is accessing performance-critical memory in a non-performant manner (i.e. the data is being satisfied by a high-latency or low-bandwidth target), the user may be able to modify the underlying data-structure or program to make it more amenable to existing caching structures, thereby significantly improving the performance of those access.

In addition, this information can be used by prediction mechanisms that may exist within requesting agents to target or modify requests depending on where in the cache or memory hierarchy a request or series of requests are being satisfied. This feedback information can be used to tune or adjust the prediction mechanisms, thereby potentially modulating subsequent activity from the requesting agent.

In FIG. 1, three integrated circuit devices or modules 100, 110, 120 are provided. They are each illustrated as being identical but this is simply for simplicity of the diagram and explanation. It will be appreciated that they may be different while sharing some of the concepts which will be discussed below in common. It will be appreciated that more than, or fewer than, three such devices may be provided.

Looking at the integrated circuit device 100 in more detail, two processor unit (CPU) clusters 130, 140 are illustrated. Again, it will be appreciated that different numbers of clusters may be provided. The clusters each comprise a pair of CPUs 132, 134 and 142, 144 along with a cluster level cache memory 136, 146. The symbol "$" is used in FIG. 1 and other drawings to represent a cache memory. Each of the CPUs has an associated cache memory 133, 135, 143, 145.

The CPU clusters are interconnected by an interconnect 150 having one or more cache memories and a "chip to chip" (C2C) interface 160. The interconnect 150 allows data packets or other quanta to be distributed between CPU clusters, to and from other integrated circuit devices via the C2C interface 160, to or from external RAM devices 170, 180 and so on.

The interconnect 150 and/or a separate node connected to the interconnect 150 acts as a so-called point of coherency and point of serialisation (PoC/PoS) 190.

Here, coherency implies that that data written to a memory address in the coherent memory system by one node is consistent with data read from that memory address in the coherent memory system by another of the nodes. A role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then coherence logic avoids conflicts with other existing copies of the data item. Serialisation relates to the ordering of the handling of memory access requests from potentially multiple requesting nodes, and potentially taking different latency periods to be serviced, so that the results from those requests are presented in the correct order to the requesting nodes, and any dependencies between the requests (for example, a data read subsequent to a data write to the same address) are correctly handled. The PoC/PoS oversees compliance with both of these by appropriately routing transactions and keeping track of the contents of the various cache memories in the coherency controlled system.

The integrated circuit devices 110, 120 contain generally similar features to the integrated circuit device 100, and these will not be described again in detail.

The lower portion of FIG. 1 represents different sources or targets of data access transactions from the point of view of an individual CPU such as the CPU 132 in the cluster 130 of FIG. 1. To the left hand side of FIG. 1 are listed, in a general order of "how local they are to the CPU 132" sources of data and/or targets of data access transactions associated with the integrated circuit device 100. These include a level 1 or level 2 cache memory associated with the CPU 132 itself (embodied by the cache memory 133 for example), the cluster cache memory 136 which may be, for example, a level 3 cache, the cache memory of a peer device in the same cluster (in the case of the CPU 132, this could be for example the CPU 134), a cache memory associated with the interconnect, for example a level 4 cache, a cache memory associated with a peer device to which a connection is required via the interconnect such as a CPU or cluster cache memory in another cluster such as the cluster 140, a cache memory at the chip to chip device 160, or an external memory device 170, 180 in a normal or prefetch mode. All of these are associated with the "local" integrated circuit.

FIG. 1 also illustrates types of memory associated with other integrated circuit devices (the devices 110, 120 in FIG. 1) which include: CPU cache memory, cluster cache memory, interconnect or C2C cache memory and external RAM devices all associated with the respective other integrated circuit device.

Figure 2:
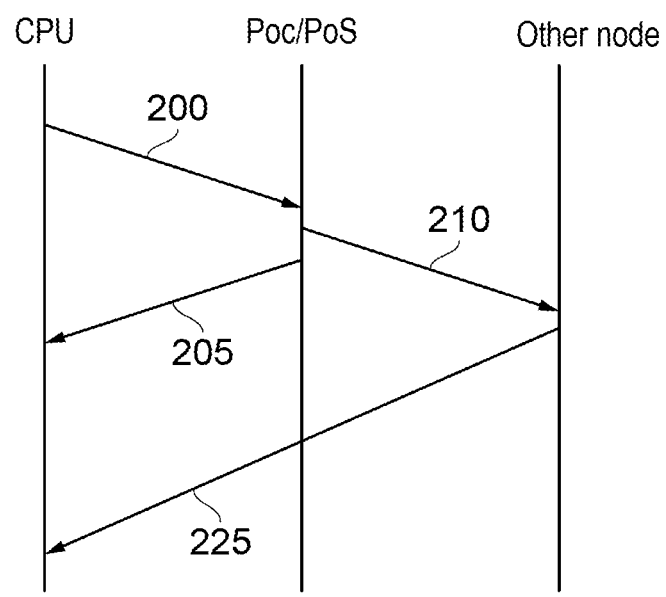
FIG. 2 schematically illustrates a data access transaction.

FIG. 2 is a schematic timing diagram illustrating a data read access.

In FIG. 2, one of the CPUs (such as the CPU 133) is attempting to read data which is overseen (from a coherency point of view) by the PoC/PoS 190. The PoC/PoS manages the ordering of handling of temporally overlapping data access requests, or data access requests where the results of one data access request are at least relevant to the timing of completion of another data access request, and to ensure that such data access requests are initiated and/or completed in the appropriate order.

The CPU 132 sends a data read request 200 to the PoC/PoS 190. The PoC/PoS detects whether it can service or fulfil the request itself, in which case it provides a data read response 205 to the CPU 132 and the process is finished.

Servicing the read request by the PoC/PoS could involve the PoC/PoS retrieving the requested data from its own cache memory (if it has one) and/or retrieving the requested data from a cache memory PoC/PoS managed by the PoC/PoS. The PoC/PoS can, in some examples, detect whether it holds a latest or valid version of the requested data, or a cache memory under its coherency management holds a latest or valid version of the requested data, by consulting records maintained by the PoC/PoS (such as a so-called snoop filter) indicating the data held by each cache memory under its control, or by querying one or more of the cache memories. The particular technique used by the PoC/PoS to detect whether it can service the read request depends upon the system architecture in use. The detection, by the PoC/PoS, of whether it can service the read request can be a pre-emptive detection (for example, using a snoop filter as mentioned above) or can be a detection resulting from a failure, by the PoC/PoS, to successfully complete an attempt to service the read request.

Servicing the read request by the PoC/PoS implies that an access is not made to a memory outside the control of the PoC/PoS in order to service the read request.

If, however, the PoC/PoS detects that it cannot service the request itself, it in turn sends a read request 210 to the appropriate other node. The other node receives the request and then returns the data as a read response 225 to the CPU 132, either via the PoC/PoS or directly to the CPU 132.

Therefore the PoC/PoS provides an example of data access circuitry to receive a data access request from a data access requesting node (such as the example CPU 132) and to route the data access request for fulfilment by one or more data storage nodes selected from a group of two or more data storage nodes (the various storage locations discussed in connection with FIG. 1.

Figure 3:
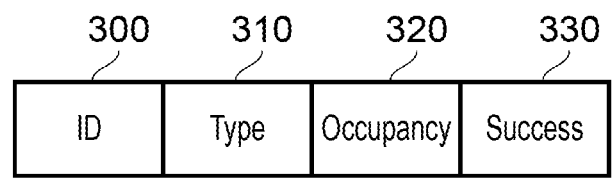
FIG. 3 schematically illustrates a source indication.

FIG. 3 schematically illustrates a DataSource field forming an example of a source indication. The DataSource field may be associated with or, in some examples, form part of the acknowledgement message returned to the requesting node at completion of a data access request. Various data items can be encoded within the DataSource field. One or more of these may be included in an actual system, and these include, an identification 300 of a particular device used in the servicing of a data access request, an identification 310 of a type of device used in the servicing of the data access request, an identification 320 of the occupancy of an agent or device used in the servicing of a data access request, and/or an identification of the success or relevance or use of a hint message in the servicing of a data access request. Examples of each of these will be discussed in detail below.

Figure 4:
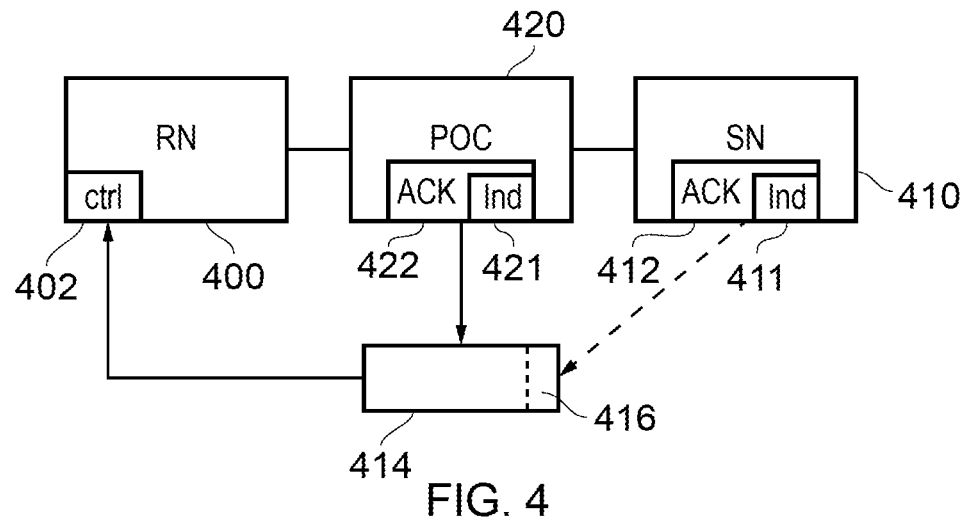
FIGS. 4 and 5 schematically illustrate the provision of a source indication.
Figure 5:
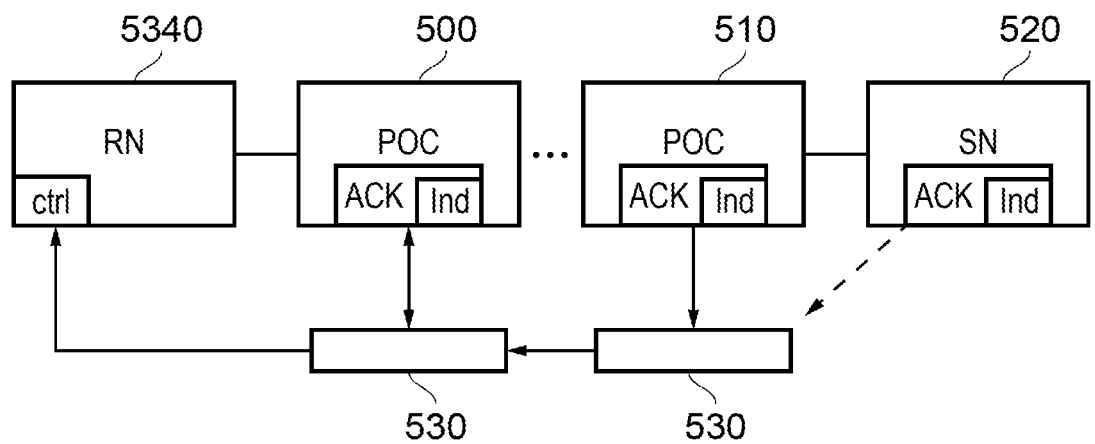

FIGS. 4 and 5 schematically illustrate the provision of such a source indication. In FIG. 4, a master or requesting node 400 communicates with a slave node 410 via a point of coherency 420 to service a data access request. It will be appreciated that various other nodes could be included within the chain of communication between the requesting node and the slave node, and that the slave node does not need to be even on the same integrated circuit as the requesting node. More than one point of coherency could attend to the transaction and such an arrangement will be described by way of example below.

Returning to FIG. 4, the requesting node issues a transaction request which is routed to the slave node. The slave node services the request and, at the completion of servicing that request, acknowledgement logic within the slave node 412 generates an acknowledgement message 414. The acknowledgment logic may include indication circuitry 411 to provide a source indication to the data access requesting node, to indicate an attribute of the one or more data storage nodes which fulfilled the data access request. The attribute can be indicated by a DataSource field 416. The acknowledgement message 414 is routed back to the requesting node, for example by the same route as used to return any data forming part of any data read request by the requesting node. The point of coherency 420 can amend the DataSource field if required, using its own acknowledgement logic 422 (which may include indication circuitry 421) as shown.

The requesting node receives the acknowledgement including the DataSource field and uses it to control a function of the requesting node via control logic 402. Example ways in which the functionality or operation of the requesting node is controlled or varied by the control logic 402 will be discussed below.

FIG. 4 therefore provides an example of a data processing apparatus comprising: a data access requesting node 400, or 132 in FIG. 1; data access circuitry 420, 410 to receive a data access request from the data access requesting node and to route the data access request for fulfilment by one or more data storage nodes 410 selected from a group of two or more data storage nodes (the node 410 is an example of one of the several data storage nodes, such as any of the cache memories ($) in FIG. 1); and indication circuitry 412, 411, 422, 421 to provide a source indication to the data access requesting node, to indicate an attribute of the one or more data storage nodes which fulfilled the data access request; the data access requesting node 400 being configured to vary its operation (by the control logic 402) in response to the source indication.

FIG. 5 shows a similar schematic arrangement but in this case there are a chain of intervening nodes such as points of coherency 500, 510. The slave node 520 generates the acknowledgement message 530 including a DataSource field and this can be modified by any of the routing nodes such as the points of coherency 500, 510 on its way back to the original requesting node 540.

The reason why it may be useful for intervening nodes to modify or establish the DataSource field will be discussed below. In some instances, the DataSource field could indicate something as straightforward as whether a data access request was fulfilled on-chip or off-chip. The actual off-chip device may not in fact be aware that it is "off-chip" compared to the requesting device, whereas an intervening point of coherency would have this information and can insert the relevant data source indication into the DataSource field.

Figure 6:
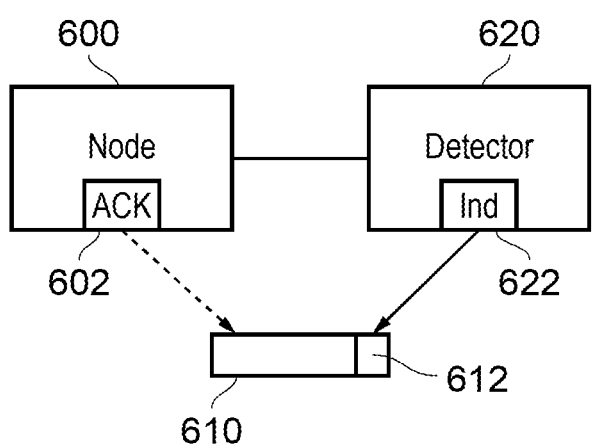
FIG. 6 schematically illustrates the provision of a loading indication.

FIG. 6 schematically illustrates the provision of a loading indication as an example of a parameter that could be included within the DataSource field. This parameter indicates the occupancy or busy-ness of a slave node or other agent involved in servicing a data access request, and is shown in FIG. 3 as the schematic data 320.

In FIG. 6, a node such as a slave node or an intervening routing node 600 generates an acknowledgement message using acknowledgment logic 602 and provides the acknowledgement message 610 to indicate completion of a data access request. A detector 620 detects the current status of the node 600 and provides indicator logic 622 to generate an indication which is included within the DataSource field 612 of the acknowledgement message 610.

FIG. 6 therefore provides an example of acknowledgement circuitry 602 to provide an acknowledgement message 610 to the data access requesting node (not shown on FIG. 6, but the recipient of the message 610) to indicate fulfilment of the data access request; in which indication circuitry 622 is configured to associate the source indication 612 with the acknowledgement message. For example the indication circuitry 622 may be configured to propagate the source indication with the acknowledgement message, for example as part of the acknowledgement message.

As mentioned above, a possible use of the DataSource field is to indicate the identity and/or type of node which services a data access request, for example by the attribute comprising information identifying which of the data storage nodes fulfilled the data access request. FIGS. 7 to 10 schematically illustrate portions of the arrangement of FIG. 1 including the devices 100, 110 and it is assumed that the CPU 132 is initiating a data access transaction.

In some examples, the DataSource field can include a unique or quasi-unique indication such as a serial number corresponding to the particular memory device which services a data handling transaction.

In other examples, the type of device can be provided, either instead or in addition to the serial number discussed above. The type of device can be treated in various different ways.

In one example, different device types are associated with: CPU cache memory, cluster cache memory, interconnect cache memory and external memory. In this example, the attribute comprises classification information identifying a classification of the one or more data storage nodes which fulfilled the data access request.

Figure 7:
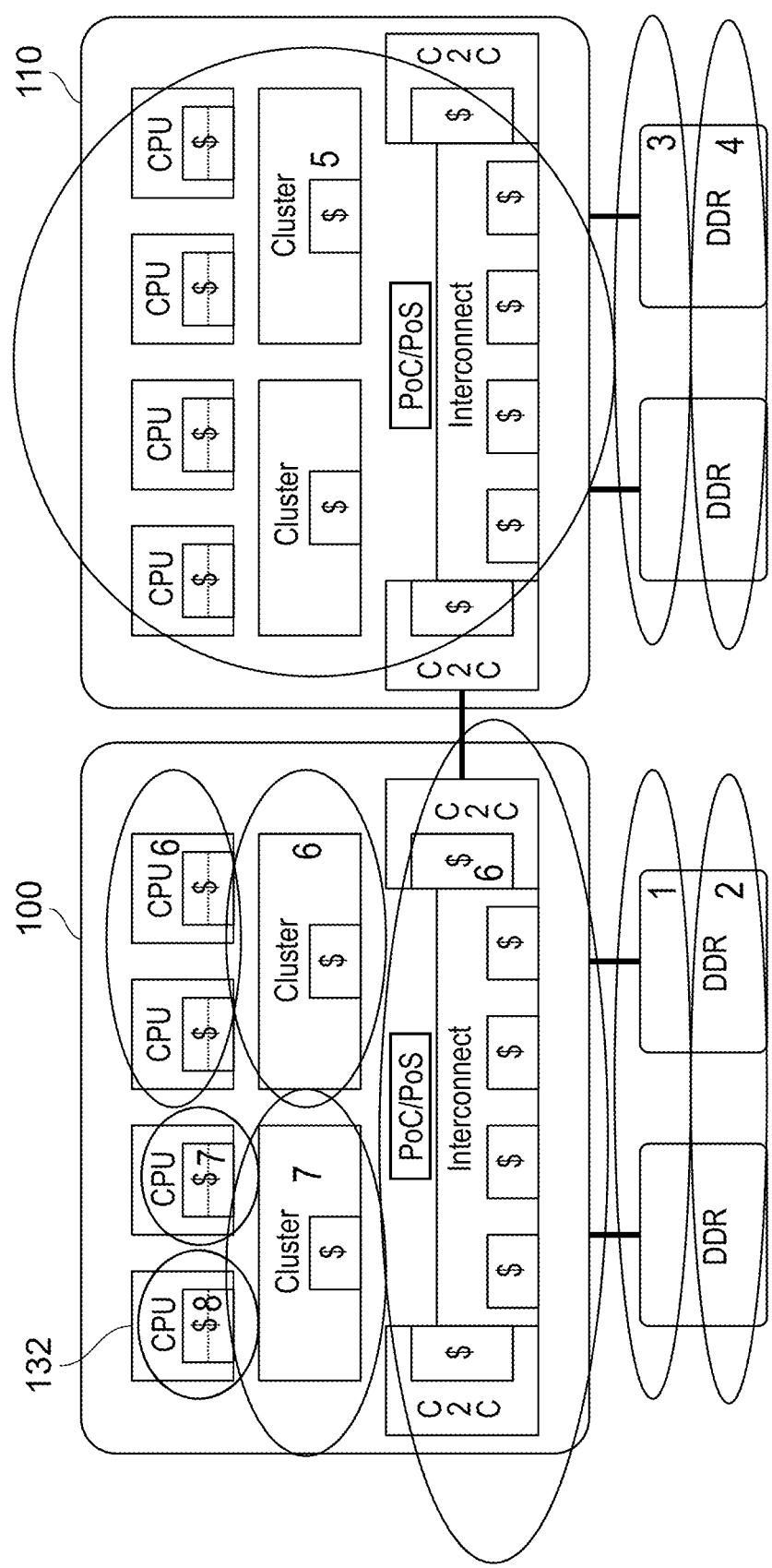
FIGS. 7 to 10 schematically illustrate example classifications of data storage nodes.

In another example, in FIG. 7, memories are ranked in relation to their latency of access relative to the requesting node (which in these examples is the CPU 132). Using an arbitrary numbering scheme, a lowest latency (highest rank) is associated with cache memory of the CPU 132 itself. A next rank (7) is associated with cache memories in the same CPU cluster. Rank 6 is associated with cache memories for which a connection is made via the interconnect, so including other clusters' cache memories and interconnect cache memories, and rank 5 relates to on-chip cache memories associated with another device such as the device 110. Further ranks 1-4 are associated with direct and prefect operations with respect of external memories. This information, when returned to the requesting node in the DataSource field, can be indicative of an expectation of performance in data accesses by that requesting node. Again, this provides an example in which the attribute comprises classification information identifying a classification of the one or more data storage nodes which fulfilled the data access request. The classification may indicate an attribute of a data transfer path between the data access requesting node and the one or more data storage nodes which fulfilled the data access request, for example in which the attribute of the data transfer path is indicative of a latency of the data transfer path.

Figure 8:
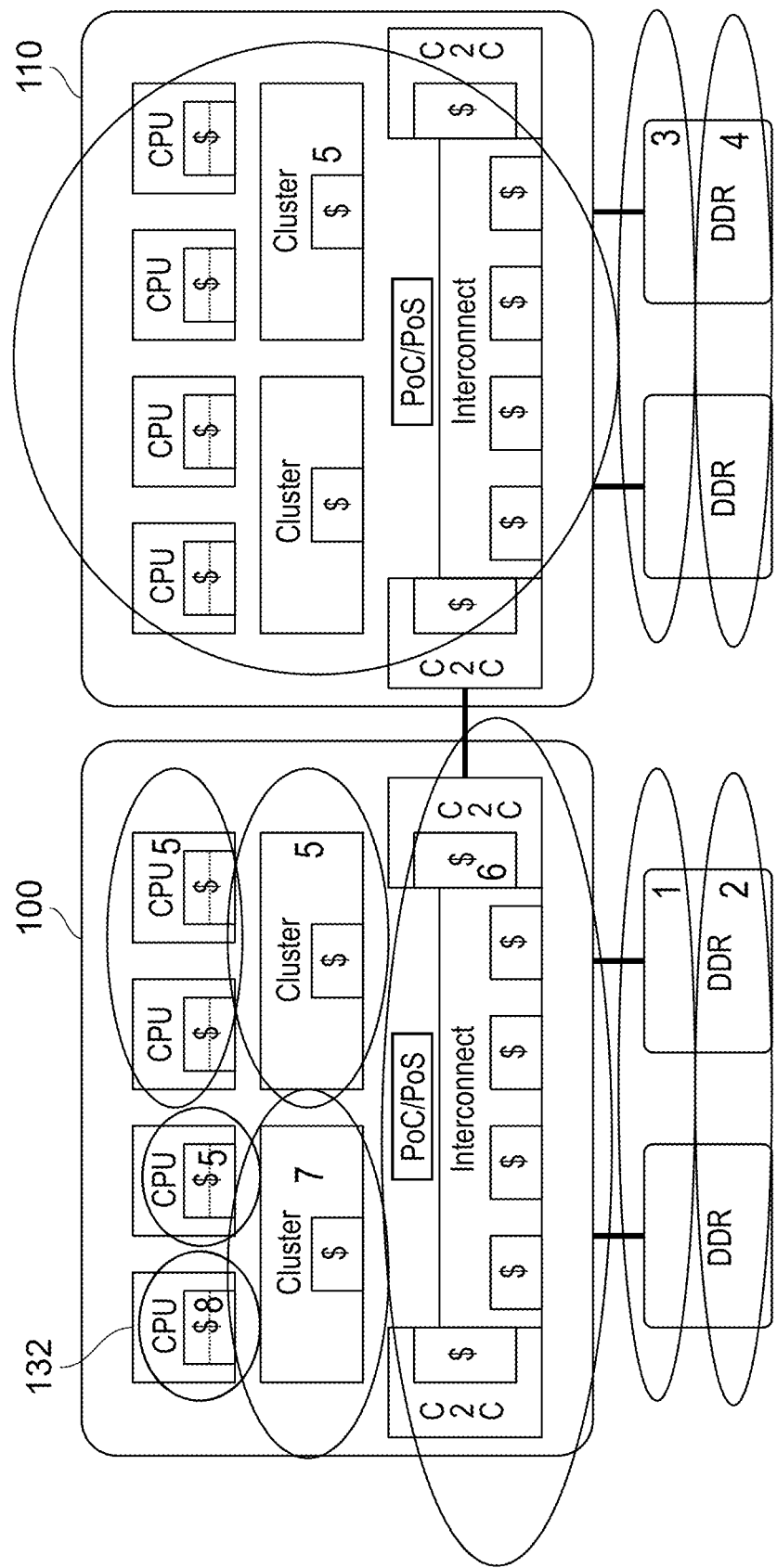

In FIG. 8, the data sources are ranked according to the path between the requesting node 132 and the memory which services the data access request, between a rank 8 (shortest path) and a rank 1 (longest path), which can help inform the requesting node why certain data may be located in a particular cache.

Figure 9:
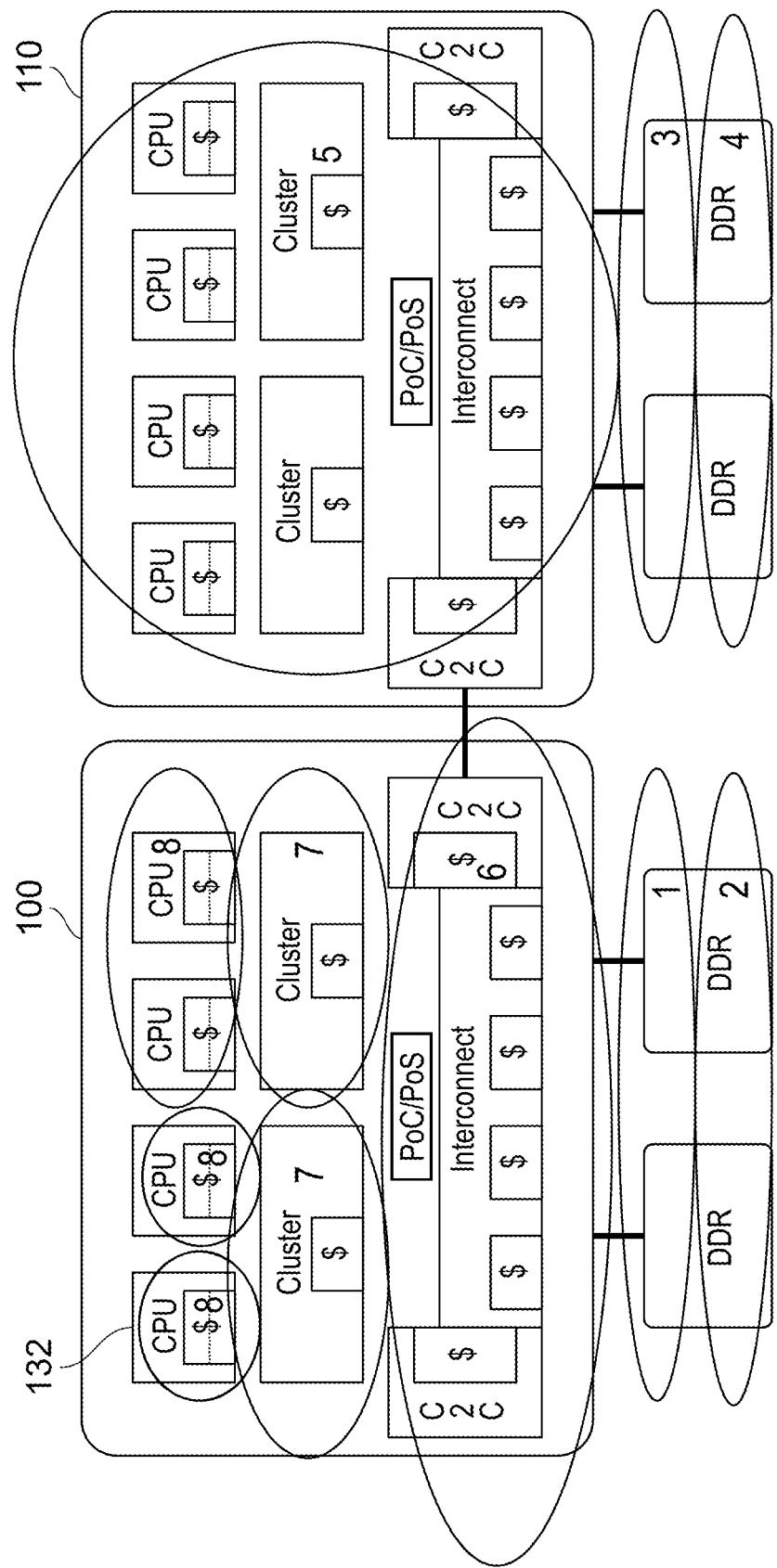

In FIG. 9, the ranking is level-based, so that level 1 or level 2 cache memories in the same integrated circuit device are ranked as rank 8, level 3 cache memories in the same integrated circuit device are ranked as rank 7, level 4 cache memories in the interconnect or C2C of the same integrated circuit device as rank 6, cache memories in the other integrated circuit devices as rank 5 and external (main) memory accesses as ranks 1-4. This arrangement can be simple to implement. This provides an example in which in which the data storage nodes are arranged as a hierarchy of storage levels, and the classification indicates the level of the one or more data storage nodes which fulfilled the request. In these examples, for at least one of the levels, data storage nodes at that level comprise cache memories, and for at least another of the levels, data storage nodes at that level comprise main memories.

Figure 10:
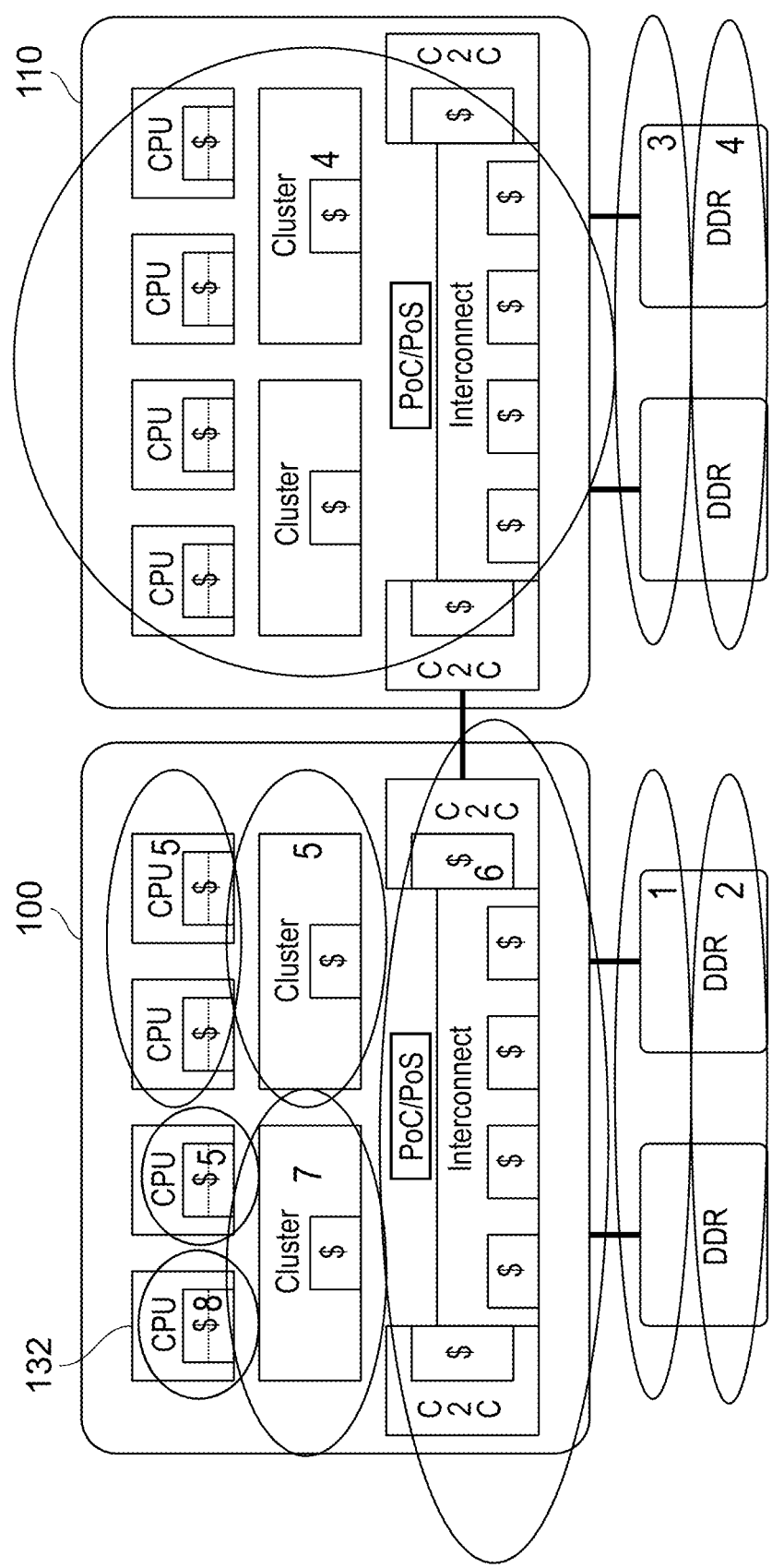

Another option for the path to memory using a simpler ranking scheme is shown in FIG. 10.

Figure 11:
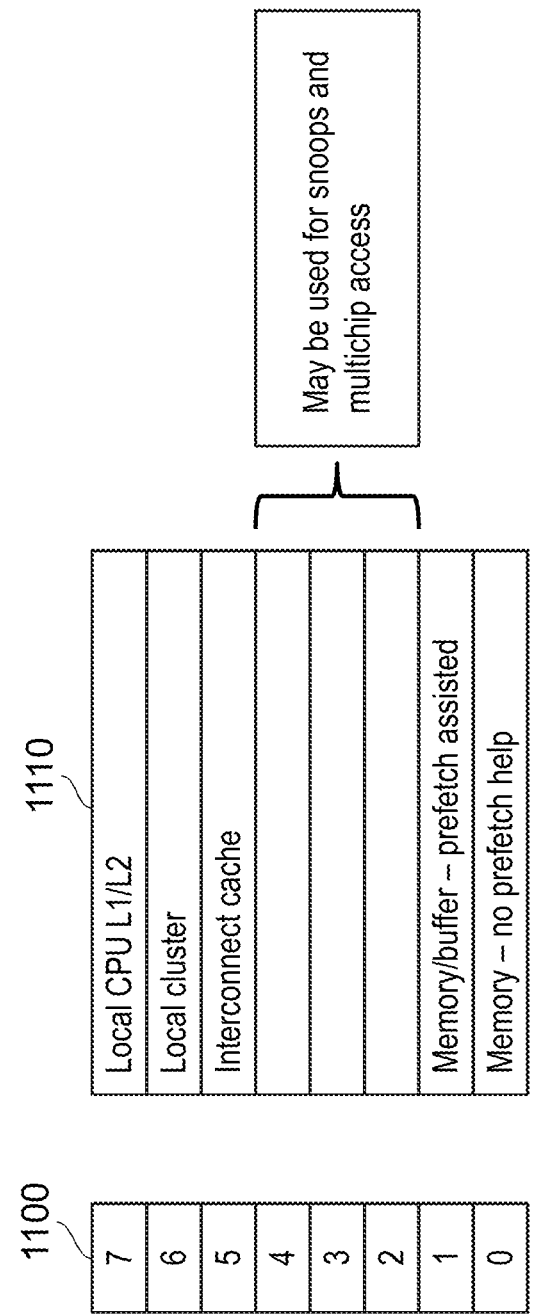
FIG. 11 schematically illustrates an example classification of data storage nodes.

FIG. 11 schematically illustrates an example classification of data storage nodes according to a 3-bit ranking 1100 (the decimal equivalent being illustrated in FIG. 11) encodable as part of the DataSource field and a type or classification 1110 of node used to service a data access request.

Figure 12:
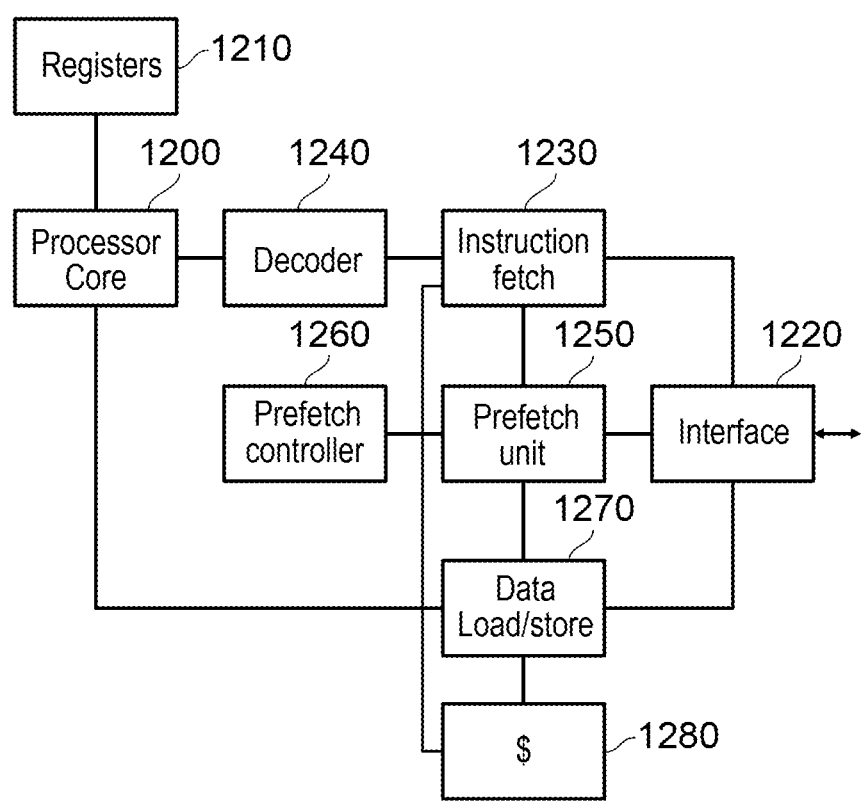
FIG. 12 schematically illustrates a data processor.

FIG. 12 schematically illustrates a data processor, for example forming one or more of the CPUs discussed above. The data processor of FIG. 12 comprises a processor core 1200 with associated data and control registers 1210 such as program status registers and registers for holding (for example temporarily) the results of processing operations, an interface 1220 connectible to an interconnect and/or external devices such as memory devices, an instruction fetch unit 1230, an instruction decoder 1240, a prefetch unit 1250, a prefetch controller 1260, a data load/store unit 1270 and a cache memory ($) 1280.

The processor core executes instructions fetched by the instruction fetch unit 1230 and decoded by the decoder 1240. In carrying out its data processing operations, it uses the registers 1210 to provide input data on which the executed instructions may act, to store output data generated by the executed instructions, and to store or maintain status information relating to activities of the processor core (including, for example, a program counter (PC) register indicating a current position within an executing program).

The instruction fetch unit 1230 fetches instructions ready for decoding, via the interface 1220, from external memory. The instruction fetch unit 1230 can also fetch instructions from the cache memory 1280. The fetching of the instructions is a precursor to the decoding of those instructions by the decoder 1240.

Similarly, the data load/store unit 1270 can obtain data for use by the processor core 1200 in its operations from the cache memory 1280 and/or via the interface 1220. Data output by the processor core can be stored to the cache memory 1280 or, again via the interface 1220, to external memory or other devices.

The prefetch unit operates under the control of the prefetch controller to anticipate the needs of the instruction fetch unit 1230 and/or the data loading function of the data load/store unit 1270, to obtain instructions and/or data from external memory or other devices, via the interface 1220, in advance of their being required either for decoding 1240 or for processing by the processor core 1200. In the case of linear execution of program code, the prefetch unit 1250 can simply act to prefetch program instructions ahead of the currently executing instructions. Doing this can reduce the latency of the instruction fetch operation 1230, because the prefetched instructions are already available to the instruction fetch unit 1230. Similarly, for some types of data access, the prefetch of data can be predictable and reliably useful if the data itself is being accessed in a reasonably predictable manner. However, in other situations, the prefetch unit 1250 might act more speculatively, for example to prefetch instructions at the target address of a branch instruction, at a point in execution of the program at which the outcome of the branch instruction has not yet been determined. For example, the branch instruction may depend upon a condition flag or the like forming part of the registers 1210 and indicating a particular condition or status applying to the outcome of execution of a yet-to-be-fully-executed instruction. So, in these circumstances, the prefetch unit 1250 is having to use an estimation or prediction of the outcome of the instruction which may cause a branch in the program flow to the target address from which instructions are being prefetched. Such branch prediction techniques are known in themselves and may or may not generate the correct outcome (which is to say, the prediction may or may not eventually prove to be correct).

So, as part of its normal operation, prefetching by the prefetch unit 1250 can operate ahead of a point in the program flow at which data or instructions (or both) are actually required, and can operate at a variable rate. At one extreme, prefetching could be disabled such that each instruction is fetched in turn by the instruction fetch unit 1230 and any data which is required to be loaded is loaded in response to that requirement by the data load/store unit 1270. At another extreme, the prefetch unit 1250 could operate at potentially a higher rate of requesting the fetching of instructions and/or data than either the instruction fetch unit 1230 acting alone or the data load/store unit 1270 acting alone.

In examples of the present arrangements, the DataSource field can provide (either entirely or as part of the provision of other information) an indication that an agent in the system is busy (to a certain level of loading such as a predetermined threshold level) or over-subscribed, which is to say that agent is currently utilised to the point where it cannot keep up with the inbound request rate. The agent concerned could be a routing agent such as an interconnect, or a memory device such as an external memory, or another device such as a "chip to chip" device as discussed above. If such an agent is impeding the handling of requests by the data processor of FIG. 12, this can be indicated by the DataSource field associated with request responses being provided back to the data processor of FIG. 12. The prefetch controller 1260 acts in these examples as a part of the data access requesting node being configured to vary its operation in response to the source indication Accordingly, in these examples the attribute comprises a loading indication, indicating a level of loading of the one or more data storage nodes which fulfilled the data access request.

This type of "busy" indication can be used by the data processor of FIG. 12 in various possible ways to vary its operation in response to the indication as part of (or as) an attribute provided by a source indication. Examples of such techniques will be described below with reference to FIGS. 13 to 17. It is noted that one or more of these different techniques can be used by the same system. In at least some of these examples, the data access requesting node is configured to vary the issuing of data access requests by that data access requesting node in response to the source indication.

Therefore FIG. 12 provides an example in which: the data access requesting node comprises prefetch circuitry; and the data access requesting node comprises control circuitry to vary the operation of the prefetch circuitry in response to the loading indication.

Figure 13:
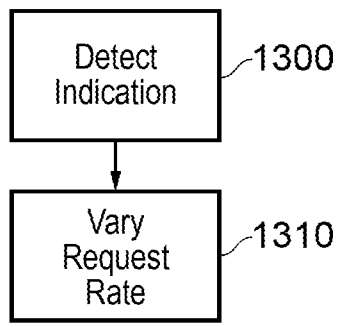
FIGS. 13 to 17 are schematic flowcharts illustrating respective methods.

In FIG. 13, at a step 1300 the prefetch controller 1260 detects an indication in the DataSource field that an agent in the system is busy, and at a step 1310 varies the rate of prefetch requests issued by the prefetch unit 1250. So, if the indication is present, or alternatively if the indication is present and persists for at least a predetermined number of cycles, the prefetch controller can reduce the request rate by the prefetch unit 1250. For example, for each predetermined period during which the DataSource field includes the indication that the agent is busy, the prefetch controller 1260 can reduce the request rate by a predetermined amount or proportion, until the indication is lifted to show that the relevant agent is no longer overloaded or busy to the threshold level. A corollary of this is that if the prefetch controller 1260 detects that the indication associated with the DataSource field shows that there is not an agent in the system which is currently oversubscribed and which is relevant to the handling of the prefetch requests, the prefetch controller 1260 can cause the prefetch unit 1250 to increase the rate of prefetch requests (assuming the prefetch unit 1250 has the capacity to do this), for example increasing the rate of requests by a predetermined amount or proportion at each predetermined period.

Figure 14:
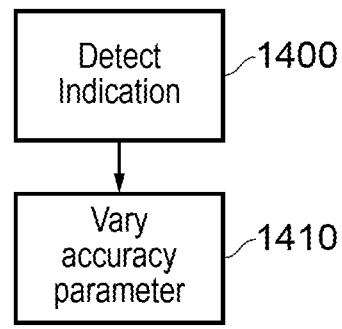

FIG. 14 relates to the control of a so-called accuracy parameter. At a step 1400, the prefetch controller 1260 detects the indication in the DataSource field as to whether the prefetching of data and/or instructions is being hampered by an oversubscription or level of busy-ness of an agent in the system servicing those requests. In response to the detected indication, the prefetch controller 1260 varies an accuracy parameter associated with the operation of the prefetch unit 1250.

As discussed above, the operation of the prefetch unit 1250 can be, at least in part, speculative, which is to say that the prefetch unit 1250 fetches instructions and/or data on the basis of a prediction or estimate of which instructions and/or data will be required next. An accuracy parameter can be used in respect of those predictions, to indicate a requirement for a level of certainty or likelihood in the predictions before a prefetch operation is initiated in respect of those predictions. For example, in the case of a chain or series of conditional branch instructions, the accuracy parameter might determine how many levels into the chain can be predicted. A higher accuracy would indicate that a smaller number of levels in the chain of possible branch instructions are predicted, whereas a lower accuracy parameter would allow a higher number of successive branch instructions to be predicted ahead of the currently executed instruction.

Varying the accuracy parameter can have an indirect effect on the number of prefetches required. Firstly, if the accuracy requirement is made higher (such that there must be a greater level of surety about the quality of a prediction before a prefetch operation is initiated) this will tend to reduce the number of prefetch operations that take place. Also, there is a second order effect in that if less accurate prefetch operations are inhibited, unnecessary prefetches are less likely to be carried out, again potentially reducing the number of prefetch operations.

Figure 15:
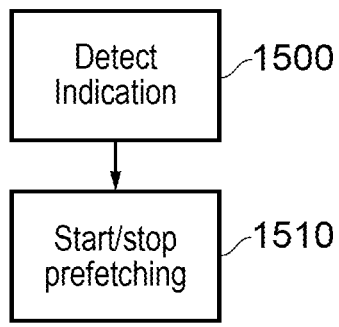

FIG. 15 represents a situation in which, in response to the detection of the indication at a step 1500 that an agent in the system servicing prefetch requests is overloaded, the prefetch controller 1260 stops prefetching at a step 1510, and restarts prefetching in response to the lifting or removal of the indication that the system is overloaded. A degree of hysteresis can be employed so that the prefetch controller waits for a predetermined period before implementing the step 1510 (in either direction) so as to avoid too many rapidly occurring changes in the status of prefetching.

Figure 16:
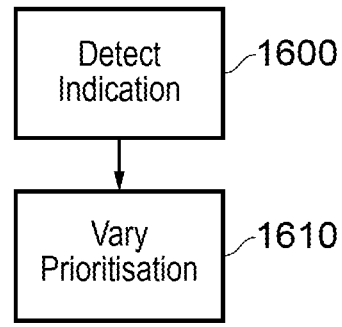

In FIG. 16, the indication is detected at a step 1600 and at a step 1610 the prioritisation of the prefetch operation is varied.

One example of this variation of prioritisation is as follows. The interface 1220 handles instruction fetches, data loads (by the data load/store unit 1270) and prefetch operations by the prefetch unit 1250. In one example of a prioritisation scheme, all of these types of accesses are handled by the interface unit 1220 which arbitrates amongst them with equal priority. In another prioritisation scheme, accesses by the instruction fetch unit 1230 and the data load/store unit 1270 (so-called "demand loads") are given priority by the interface unit 1220 and/or the prefetch unit 1250 over prefetch operations by the prefetch unit 1250. So, in an example arrangement, in response to an indication that an agent in the system is oversubscribed, priority can be given by the interface unit 1220 and/or the prefetch unit 1250 to demand loads. In the absence of such an indication, the other type of prioritisation scheme can be used such that the various different types of access all compete and are simply arbitrated by the interface 1220. Therefore, in these examples, the data access requesting node is configured to access two or more data types (such as prefetch and demand loads); and the data access requesting node is configured to vary a priority of accessing data of the two or more data types in response to the loading indication.

Figure 17:
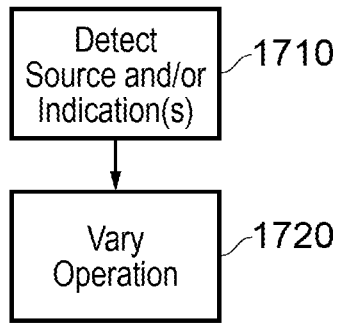

FIG. 17 schematically illustrates another example in which one or both of the type or identity of a data source (such as the type or identity of a memory device as discussed above) and the indication of busy-ness is detected at a step 1710, and operation of the prefetch unit 1250 is varied in response at a step 1720. Examples of such a variation at the step 1720 include (a) if an indication is received that an agent in the system servicing the prefetch requests is busy, the prefetch requests can be marked by a data flag indicating a level of competence or accuracy (as discussed above with reference to FIG. 14) in those requests, which then enables the target agent in the memory system to prioritise or de-prioritise those requests. For example, if an agent in the system is busy such that it cannot successfully handle all of the prefetch requests being issued, it could discard low-confidence requests but continue to service high-confidence requests.

(b) another variation of operation at the step 1720 is to prioritise data loads which are latency-critical (that is to say, they will cause latency problems if they are delayed) over non-latency-critical loads.

Therefore, in these examples, the data access requesting node is configured, in response to the loading indication, to vary one or more of:

a request rate of the prefetch circuitry;
an operational status of the prefetch circuitry;
a status indication of prefetch data access requests;
an accuracy requirement of the prefetch circuitry;
a priority of latency-critical data access requests with respect to non-latency-critical data access requests; and
a priority of prefetch operations with respect to demand-based data access operations.

Another type of information which can potentially be made available in the DataSource field is an indication of success or failure or a prior "read hint" command. This command type is sent by a master or requesting device to a memory controller in order to initiate the handling of a memory access, with the aim of reducing latency. The memory access is started in advance of a subsequent read command. These arrangements are speculative and the read hint may or may not be relevant to a subsequent read command.

Figure 18:
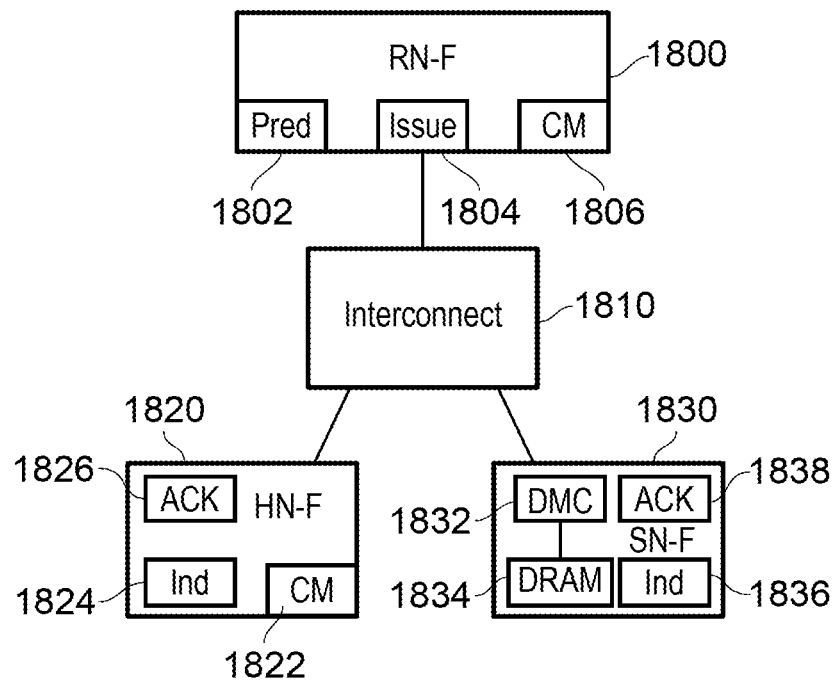
FIG. 18 schematically illustrates a data processing apparatus.

FIG. 18 schematically illustrates a part of a data processing apparatus to which this arrangement is relevant, and schematically illustrates a data processing apparatus embodied as a network of devices interconnected by an interconnect 1810. The apparatus may be provided as a single integrated circuit such as a so-called system on chip (SoC) or network on chip (NoC) or as a plurality of interconnected discrete devices.

Various so-called nodes are connected via the interconnect 1800. These include one or more home nodes (HN) 1820 which oversee data coherency within the networked system (for example acting as PoC/PoS), one or more slave nodes (SN) 1830 such as a higher level cache memory (the reference to "higher level" being with respect to a cache memory provided by a requesting node and described below), a main memory and a peripheral device. The selection of slave nodes shown in FIG. 18 is such that zero or more of each type of slave node may be provided. FIG. 18 shows just one slave node 1830 (as this one is relevant to the discussion below) but other slave nodes may be provided.

The slave node 1830 comprises, in this example, a memory controller (DMC) 1832, a memory (DRAM) 1834, indication circuitry 1836 to provide a source indication to the data access requesting node, to indicate an attribute of the one or more data storage nodes which fulfilled the data access request and acknowledgement circuitry 1838 to provide an acknowledgement message to the data access requesting node to indicate fulfilment of the data access request.

FIG. 18 also shows a requesting node (RN) 1800 of (potentially) a plurality of so-called requesting nodes (RN) which in this example operates according to the CHI (coherent hub interface) protocol.

The RN 1800 is a fully coherent RN (RN-F) having an associated cache memory 1806. More generally, the nodes can be fully coherent or input/output (I/O) coherent. A fully coherent HN or RN (HN-F, RN-F respectively) includes coherent cache storage. For example, the HN-F 1820 comprises cache storage 1822. A fully coherent SN (SN-F) is paired with an HN-F. An HN-F can manage coherency for a memory region.

The RN 1800 also comprises predictor circuitry 1802 and issue circuitry 1804, the operation of which will be described below.

Figure 19:
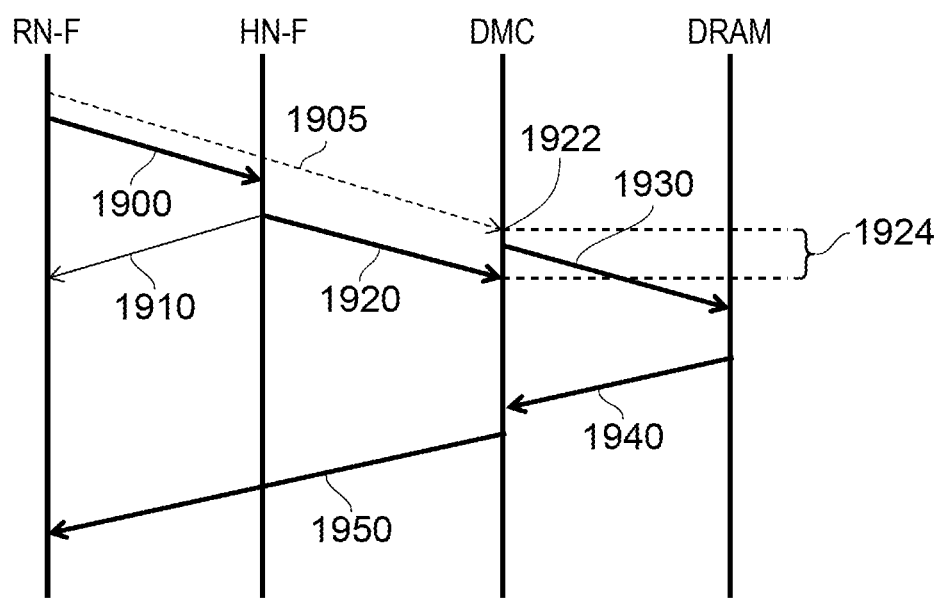
FIG. 19 schematically illustrates a data access transaction.

FIG. 19 is a schematic timing diagram illustrating a data read access.

In FIG. 19, the RN 1800 is attempting to read data which is overseen (from a coherency point of view) by the home node HN-F 1820. The HN-F acts as a so-called point of coherency (PoC). In terms of managing the ordering of handling of temporally overlapping data access requests, or data access requests where the results of one data access request are at least relevant to the timing of completion of another data access request, the HN-F may also act as a so-called point of serialisation (PoS) to ensure that such data access requests are initiated and/or completed in the appropriate order.

The requesting node sends a data read request 1900 to the home node. The home node detects whether it can service or fulfil the request itself, in which case it provides a data read response 1910 to the requesting node and the process is finished.

Servicing the read request by the home node could involve the home node retrieving the requested data from its own cache memory (if it has one) and/or retrieving the requested data from a cache memory (such as one or more of the cache memories 1806, 1822) managed by the home node in its role as a PoC. The home node can, in some examples, detect whether it holds a latest or valid version of the requested data, or a cache memory under its coherency management holds a latest or valid version of the requested data, by consulting records maintained by the home node as PoC (such as a so-called snoop filter) indicating the data held by each cache memory under its control as PoC, or by querying one or more of the cache memories. The particular technique used by the home node to detect whether it can service the read request depends upon the system architecture in use. The detection, by the home node, of whether it can service the read request can be a pre-emptive detection (for example, using a snoop filter as mentioned above) or can be a detection resulting from a failure, by the home node, to successfully complete an attempt to service the read request.

Servicing the read request by the home node implies that an access is not made to the slave node 1830 in order to service the read request.

If, however, the home node detects that it cannot service the request itself, it in turn sends a read request 1920 to the appropriate slave node SN 1830.

The memory controller (DMC) of the slave node responds to a read request from the HN by receiving the request and, as a transaction between the DMC 1832 and the DRAM 1834, reading the required data from the memory (DRAM). The memory controller then returns the data as a read response to the requesting node, either via the home node or directly to the requesting node. In examples, the read request provided by the home node can specify another node (such as the RN), in data communication with the memory controller or access circuitry, to which the read response should be provided.

Latency in a memory access is (in at least some situations) important or even critical to system performance. To attempt to reduce latency which would be potentially introduced by the read request having to go first to the HN, in FIG. 19 the RN issues the data read request 1900 and also (selectively) issues a so-called "read hint" message 1905 directly to the memory controller of the slave node which will have to service or fulfil the read request if the home node cannot itself do so. The RN-F can detect which slave node is relevant to a read request from system configuration or memory map information. The predictor circuitry determines, as discussed below, whether to send the read hint message.

The home node proceeds as described above, either returning the required data as the read response 1910 or sending the read request 1920 to the slave node. However, in the present case, the slave node has already initiated a transaction 1930, 1940 to retrieve the required data in response to receipt at a time 1922 of the read hint 1905. So, rather than the slave node waiting until receipt of the read request 1920 to even start the transaction 1930, the memory controller is able to start the transaction 1930 earlier in response to receipt of the read hint 1905. As before, once the memory controller receives the required data it provides the required data as a read response 1950 to the RN-F.

The earlier initiation of the transaction 1930, 1940 because of the provision of the read hint 1905 allows a saving in latency of a period 1924. The length of such a period depends on many different design parameters and aspects of the system, but in example embodiments such a saving can be significant in relation to the overall time taken for a data read from the DRAM.

Figure 20:
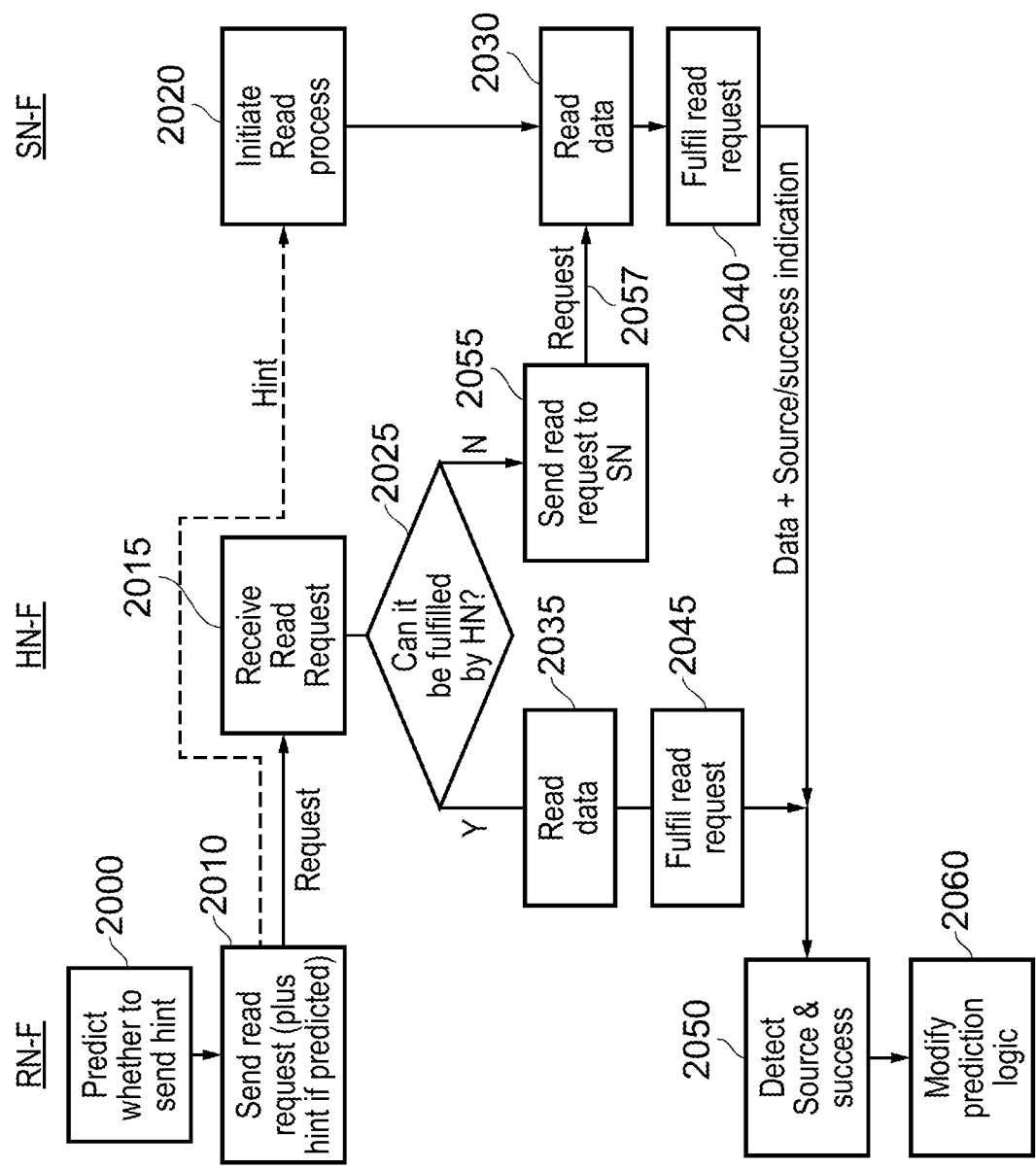
FIGS. 20 to 24 are schematic flowcharts illustrating respective methods.

FIG. 20 is a schematic flowchart illustrating the use of read hint messages as discussed above.

At a step 2000, the predictor circuitry 1802 of the requesting node 1800 predicts whether or not to send a read hint. In the present examples, this prediction is based at least in part upon information returned by the DataSource field as discussed below. This provides an example in which the data access requesting node is configured to vary the issuing of data access requests by that data access requesting node (for example, as between sending read hints and not sending read hints) in response to the source indication.

At a step 2010, the issue circuitry 1804 of the requesting node 1800 sends a read request, plus a read hint if predicted. The read request is passed to the home node 1820 where it is processed at a step 2015. The read hint, if issued, is passed to the relevant slave node 1830 where it is processed at a step 2020.

Returning to the operation of the home node, the home node receives the read request at the step 2015 and detects, at a step 2025, whether that request can be fulfilled by the home node. For example, the detection can be by consulting data held by the home node such as snoop filter directories, to detect whether or not an up-to-date copy of the requested data is held by a cache memory under the control of the home node 1820. Or the detection can be by attempting the request and detecting whether the attempt succeeded.

If the read request can be fulfilled by the home node then control passes to a step 2035 at which the home node reads the requested data and, at a step 2045, fulfils the read request, sending an acknowledgement by acknowledgement circuitry 1826 and, optionally, an indication by indication circuitry 1824 to indicate that the request was fulfilled by the HN-F.

If, however, the detection at the step 2025 was that the home node could not fulfil the read request, then the home node issues a read request to the slave node at a step 2055.

Turning to the operation of the slave node, in response to the read hint (if issued), the slave node initiates a read process at the step 2020. Then, at a step 2030, the slave node initiates the reading of the requested data in response to the request 2057 from the home node. At a step 2040, the slave node fulfils the read request.

So, the read hint, if issued, caused the read process to be initiated early at the step 2020 in advance of the receipt of the read request 2057 and its processing at the step 2030. As discussed above with reference to the timing diagram of FIG. 19, this can reduce the latency of a read operation which cannot be fulfilled by the home node but has to be forwarded on to the slave node for fulfilment.

The slave node returns the required data to the requesting node as part of fulfilling the read request at the step 2040. The slave node also provides information, for example as part of the DataSource field, indicating the relevance and success of any prior read hint command. Such information or attribute can be provided by the indication circuitry 1836 and optionally associated with or provided as part of an acknowledgement generated and returned to the requesting node by the acknowledgement circuitry 1838. Various permutations of the steps 2020 . . . 2040 are possible:

(a) a read hint was received and subsequently (for example, within a threshold time-out period of the receipt of the read hint) a read request was received corresponding to the same data access transaction (that is to say, the same requesting node and/or the same address to be read and/or the same transaction identifier). So, in such circumstances, the read process was received at a step 2020 and the latency of the overall operation of the slave node was reduced by virtue of the provision of the read hint message. In these circumstances, the DataSource field indicates that the read hint was issued, and relevant.

(b) no read hint was received prior to the receipt of the read request at the step 2030. Here, no latency advantage was obtained and the DataSource field provides an indication that a relevant read hint was not received.

(c) a read hint was received and a read operation initiated at the step 2020, but a subsequent read request was received for a different transaction and so the initial read hint was irrelevant. Here, the DataSource field is used to signal that a relevant read hint was not received.

Returning to the operation of the requesting node, the requesting node receives the read data either from the home node via the step 2045 or from the slave node via the step 2040, at a step 2050 accompanying the read data is the DataSource field from which the requesting node detects the identity of the source of the data (the home node or the slave node) and/or the success of the use of the read hint message. In response to these aspects of the DataSource field, the requesting node modifies the prediction logic applied at the step 2000, at a step 2060.

Example ways in which the prediction logic used at the step 2000 can be modified are as follows.

In one example, the prediction logic responds to the identification of the source or type of source from which the data is provided. A predominance or a threshold proportion of data read requests being fulfilled by the slave node rather than by the home node tends to steer the prediction towards including the read hint message. A predominance or a threshold proportion of requests being fulfilled by the home node would tend to steer the prediction towards not sending the read request.

In another example, for those read hint messages which are sent, a threshold proportion or a predominance of "relevant and useful" messages received back from the slave node would tend to steer the prediction towards sending more read hint messages. A predominance or at least a threshold proportion of messages received back from the slave node indicating that the read hint was not useful would tend to steer the prediction logic towards reducing the number of read hint messages being sent.

Therefore, in these examples, the data access requesting node comprises: predictor circuitry to predict whether a next data access request will be fulfilled by a first data storage node or a second data storage node, the first and second data storage nodes being arranged so that if a data access request is not fulfilled by the first data storage node, it is fulfilled by the second data storage node; and issue circuitry to issue data access requests for fulfilment by the first data storage node, the issue circuitry being configured to issue an indication, for routing to the second data storage node, that a given data access request may need to be fulfilled by the second data storage node, in response to the predictor circuitry predicting that the given data access request will be fulfilled by the second data storage node. The attribute can indicate whether the data access request was fulfilled by the first data storage node or the second data storage node; and the predictor circuitry can be configured to vary its prediction operation in response to the source indication. In the examples, the attribute comprises a success indication, indicating whether the data access request was fulfilled by the data storage node initiating that data access in response to a data access hint message and fulfilling that data access in response to a subsequent data access request.

Therefore, FIG. 18 (operating as discussed above) provides an example of data access circuitry 1810, 1820, 1830 to receive a data access request from a data access requesting node 1800 in data communication with the data access circuitry and to route the data access request for fulfilment by one or more data storage nodes 1830 selected from a group of two or more data storage nodes 1830, 1822, 1806; acknowledgement circuitry 1838 to provide an acknowledgement message to the data access requesting node to indicate fulfilment of the data access request; and indication circuitry 1836 to associate with the acknowledgement message a source indication, indicating an attribute of one or more of the group of data storage nodes which fulfilled the data access request.

It will be appreciated from the various examples given above that the acknowledgement circuitry and indication circuitry can be embodied separately or together.

The examples above concern a DataSource field which can form part of an acknowledgement of completion of a transaction. Features of such an arrangement are that the acknowledgement would be sent anyway, and so including a DataSource field as part of or in association with the acknowledgement does not necessarily imply an increase in bandwidth requirements of the system (which is to say, it does not necessarily require any additional messages beyond those which would be sent in a normal transaction handling protocol anyway). It also means that each request, when completed, has associated DataSource field information of one or more of the various types discussed above.

Figure 21:
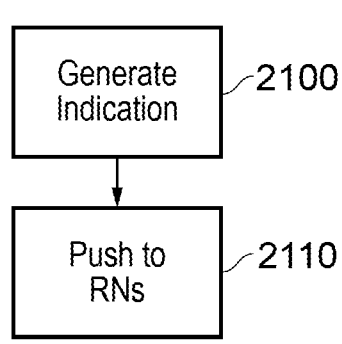
Figure 22:
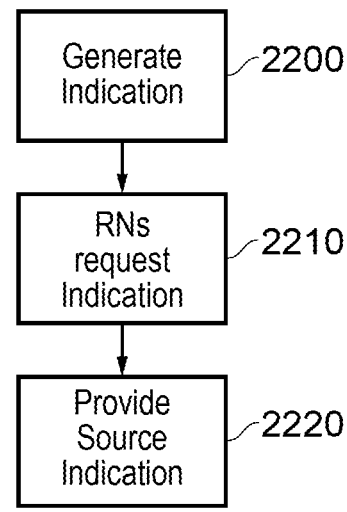

However, other arrangements are possible, and indeed acknowledgement circuitry does not have to be provided. The DataSource field or the information described above as relating to such a field could be sent as a separate message. FIG. 21 is a schematic flowchart in which, at a step 2100, the indication appropriate to the type of data described above is generated and, at a step 2110, it is transmitted (whether as part of a DataSource field forming part of an acknowledgement message or as a separate message) in a "push" fashion to transaction initiating nodes such as RNs in the system. In an alternative, illustrated schematically by the flowchart of FIG. 22, the indication discussed above can be generated either for each transaction or when required at a step 2200. Then, in response to a step 2210, in which a transaction initiating node such as an RN requests the indication, the indication is provided to that requesting node at a step 2220. So, FIG. 22 relates to a "pull" transfer of the indication rather than FIG. 21 relating to a "push" technique.

Figure 23:
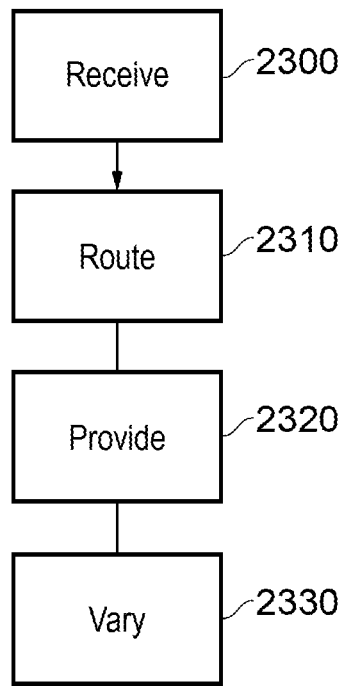

FIG. 23 is a schematic flowchart illustrating a data processing method comprising:

receiving (at a step 2300) a data access request from a data access requesting node;

routing (at a step 2310) the data access request for fulfilment by one or more data storage nodes selected from a group of two or more data storage nodes;

providing (at a step 2320) a source indication to the data access requesting node, to indicate an attribute of the one or more data storage nodes which fulfilled the data access request;

varying (at a step 2330) the operation of the data access requesting node in response to the source indication.

Figure 24:
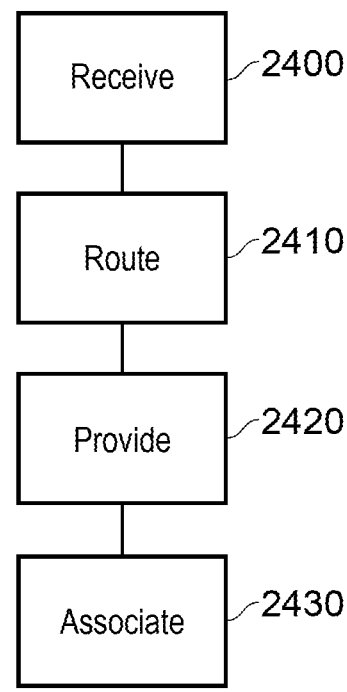

FIG. 24 is a schematic flowchart illustrating a data storage method comprising:

receiving (at a step 2400) a data access request from a data access requesting node;

routing (at a step 2410) the data access request for fulfilment by one or more data storage nodes selected from a group of two or more data storage nodes;

providing (at a step 2420) an acknowledgement message to the data access requesting node to indicate fulfilment of the data access request; and associating (at a step 2430) with the acknowledgement message a source indication, indicating an attribute of one or more of the group of data storage nodes which fulfilled the data access request.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
   a data access requesting node;
   data access circuitry to receive a data access request from the data access requesting node, the data access circuitry being configured to manage coherent data storage by a cache memory that is accessible as a data storage node by the data access circuitry and to issue data access requests to a further data storage node;
   the data access circuitry being configured to detect whether the data access circuitry can fulfill the data access request itself, wherein:
   in response to the data access circuitry detecting that the data access circuitry can fulfill the data access request itself, the data access circuitry is configured to fulfill the data access request itself; and
   in response to the data access circuitry detecting that the data access circuitry cannot fulfill the data access request itself, the data access circuitry is configured to route the data access request to the further data storage node as a further data access request to the further data storage node; and
   indication circuitry to provide a source indication to the data access requesting node to indicate an attribute identifying a data storage node that fulfilled the data access request;
   the data access requesting node being configured to vary its operation in response to the source indication.

2. Apparatus according to claim 1, in which the attribute comprises classification information identifying a classification of the one or more data storage nodes which fulfilled the data access request.

3. Apparatus according to claim 2, in which the classification indicates an attribute of a data transfer path between the data access requesting node and the one or more data storage nodes which fulfilled the data access request.

4. Apparatus according to claim 3, in which the attribute of the data transfer path is indicative of a latency of the data transfer path.

5. Apparatus according to claim 2, in which the data storage nodes are arranged as a hierarchy of storage levels, and the classification indicates the level of the one or more data storage nodes which fulfilled the request.

6. Apparatus according to claim 5, in which, for at least one of the levels, data storage nodes at that level comprise cache memories, and for at least another of the levels, data storage nodes at that level comprise main memories.

7. Apparatus according to claim 1, in which the data access requesting node is configured to vary the issuing of data access requests by that data access requesting node in response to the source indication.

8. Apparatus according to claim 1, in which the attribute comprises a loading indication, indicating a level of loading of the one or more data storage nodes which fulfilled the data access request.

9. Apparatus according to claim 8, in which:
   the data access requesting node is configured to access two or more data types; and
   the data access requesting node is configured to vary a priority of accessing data of the two or more data types in response to the loading indication.

10. Apparatus according to claim 8, in which:
   the data access requesting node comprises prefetch circuitry; and the data access requesting node comprises control circuitry to vary the operation of the prefetch circuitry in response to the loading indication.

11. Apparatus according to claim 10, in which the data access requesting node is configured, in response to the loading indication, to vary one or more of:
a request rate of the prefetch circuitry;
an operational status of the prefetch circuitry;
a status indication of prefetch data access requests;
an accuracy requirement of the prefetch circuitry;
a priority of latency-critical data access requests with respect to non-latency-critical data access requests; and
a priority of prefetch operations with respect to demand-based data access operations.

12. Apparatus according to claim 1, in which the data access requesting node comprises:
predictor circuitry to predict whether a next data access request will be fulfilled by a first data storage node or a second data storage node, the first and second data storage nodes being arranged so that if a data access request is not fulfilled by the first data storage node, it is fulfilled by the second data storage node; and
issue circuitry to issue data access requests for fulfilment by the first data storage node, the issue circuitry being configured to issue an indication, for routing to the second data storage node, that a given data access request may need to be fulfilled by the second data storage node, in response to the predictor circuitry predicting that the given data access request will be fulfilled by the second data storage node.

13. Apparatus according to claim 12, in which:
the attribute indicates whether the data access request was fulfilled by the first data storage node or the second data storage node; and
the predictor circuitry is configured to vary its prediction operation in response to the source indication.

14. Apparatus according to claim 13, in which the attribute comprises a success indication, indicating whether the data access request was fulfilled by the data storage node initiating that data access in response to a data access hint message and fulfilling that data access in response to a subsequent data access request.

15. Apparatus according to claim 1, comprising:
acknowledgement circuitry to provide an acknowledgement message to the data access requesting node to indicate fulfilment of the data access request;
in which the indication circuitry is configured to associate the source indication with the acknowledgement message.

16. Apparatus according to claim 15, in which the indication circuitry is configured to propagate the source indication with the acknowledgement message.

17. A data processing method comprising:
receiving, by data access circuitry, a data access request from a data access requesting node, the data access circuitry managing coherent data storage by at least a cache memory that is accessible as a data storage node by the data access circuitry and issuing data access requests to a further data storage node;
detecting whether the data access circuitry can fulfill the data access request itself;
in response to a detection that the data access circuitry can fulfill the data access request itself, the data access circuitry fulfilling the data access request itself;
in response to a detection that the data access circuitry cannot fulfill the data access request itself, the data access circuitry routing the data access request to the further data storage node as a further data access request to the further data storage node;
providing a source indication to the data access requesting node to indicate an attribute identifying which of the data storage nodes fulfilled the data access request; and
varying the operation of the data access requesting node in response to the source indication.

* * * * *